United States Patent
Kravets

(10) Patent No.: US 8,699,631 B2
(45) Date of Patent: Apr. 15, 2014

(54) RECEIVER WITH SELECTIVE SIGNAL PATH OPERATION AND ASSOCIATED METHODS

(75) Inventor: Oleksiy Kravets, Petersburg (CA)

(73) Assignee: BlackBerry Limited, Waterloo, Ontario (CA)

( * ) Notice: Subject to any disclaimer, the term of this patent is extended or adjusted under 35 U.S.C. 154(b) by 16 days.

(21) Appl. No.: 13/309,994

(22) Filed: Dec. 2, 2011

(65) Prior Publication Data
US 2013/0142287 A1 Jun. 6, 2013

(51) Int. Cl.
*H04L 27/06* (2006.01)
*H04B 1/16* (2006.01)

(52) U.S. Cl.
USPC ............ 375/340; 375/316; 455/231; 455/230

(58) Field of Classification Search
USPC .......... 375/350, 219, 316, 346, 340; 455/130, 455/313, 231, 230
See application file for complete search history.

(56) References Cited

U.S. PATENT DOCUMENTS

| | | | |
|---|---|---|---|
| 7,580,692 B2 * | 8/2009 | Kravets | 455/302 |
| 2006/0126702 A1 * | 6/2006 | Burdett | 375/136 |
| 2006/0141974 A1 | 6/2006 | Campbell et al. | |
| 2008/0240151 A1 | 10/2008 | Chitrapu et al. | 370/465 |
| 2009/0086864 A1 * | 4/2009 | Komninakis et al. | 375/346 |
| 2010/0171542 A1 * | 7/2010 | Dawe et al. | 327/355 |
| 2011/0038405 A1 * | 2/2011 | Axnas et al. | 375/227 |
| 2011/0096875 A1 * | 4/2011 | Amrutur et al. | 375/343 |

FOREIGN PATENT DOCUMENTS

WO 2010123573 10/2010

* cited by examiner

*Primary Examiner* — Chieh M Fan
*Assistant Examiner* — Michelle M Koeth
(74) *Attorney, Agent, or Firm* — Allen, Dyer, Doppelt, Milbrath & Gilchrist, P.A.

(57) ABSTRACT

A receiver includes a first local oscillator, and an in-phase mixer and a quadrature mixer coupled to the first local oscillator and configured to generate in-phase and quadrature signals based upon received RF signals. A complex mixer is downstream from the in-phase and quadrature mixers. A controller is coupled to the in-phase and quadrature mixers and is configured to determine when the in-phase and quadrature signals include interference less than an interference threshold, and then powers off one of the in-phase and quadrature mixers.

23 Claims, 6 Drawing Sheets

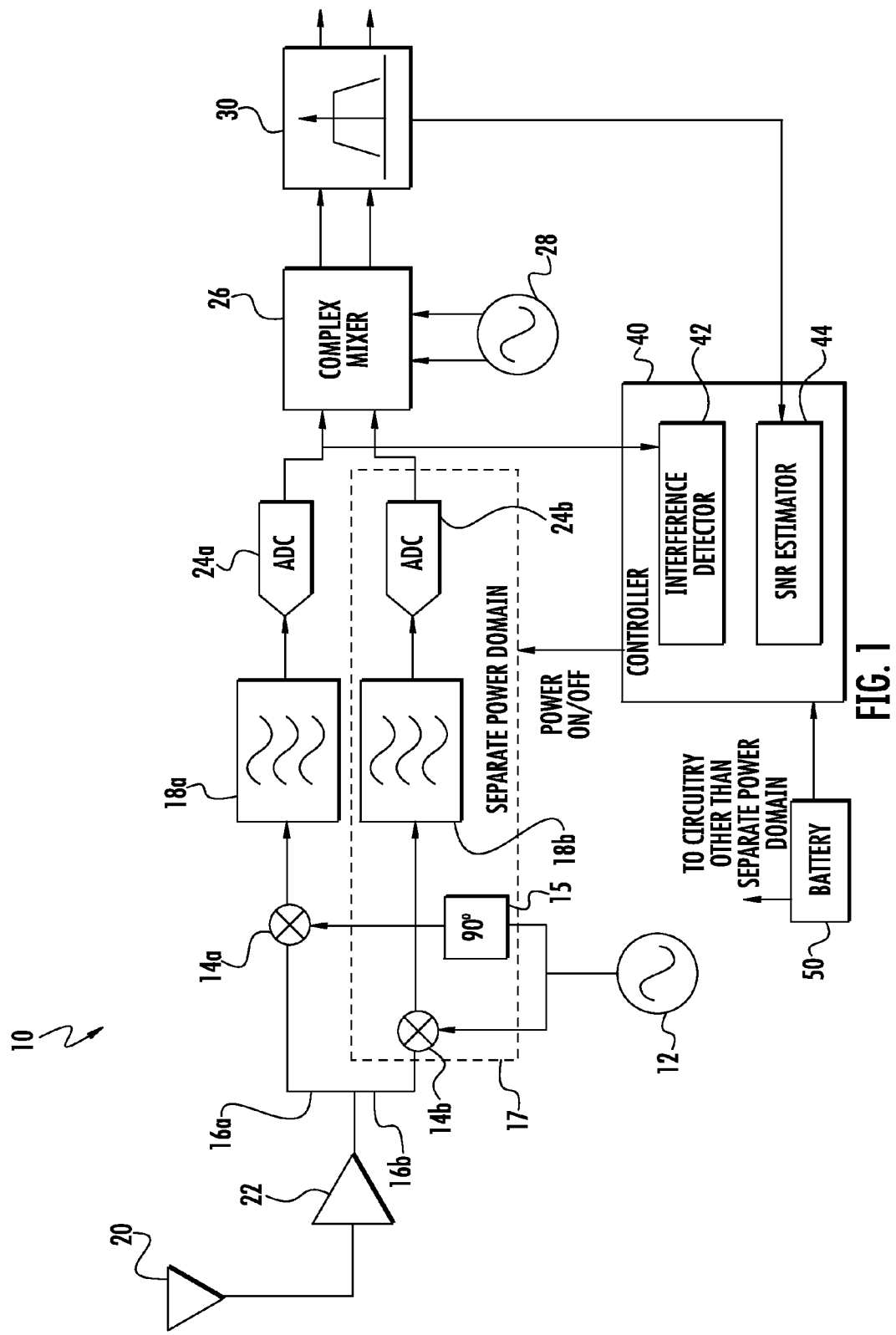

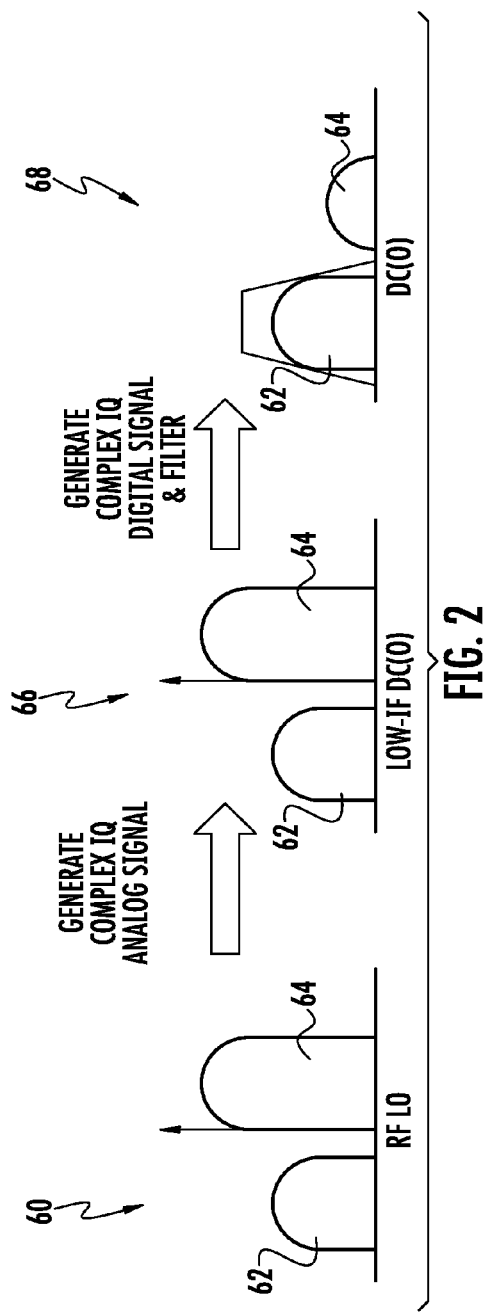
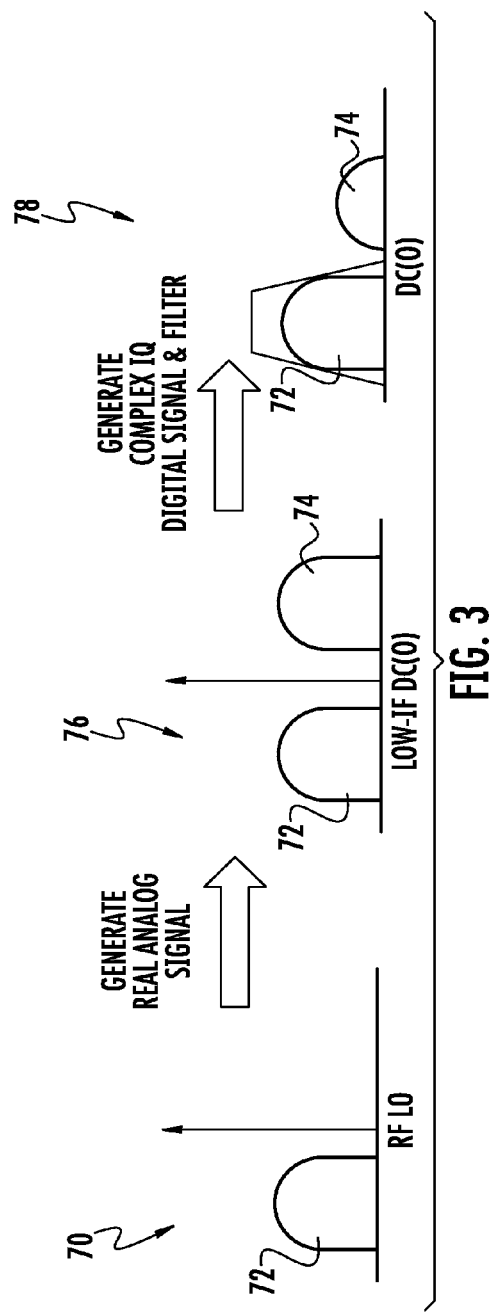

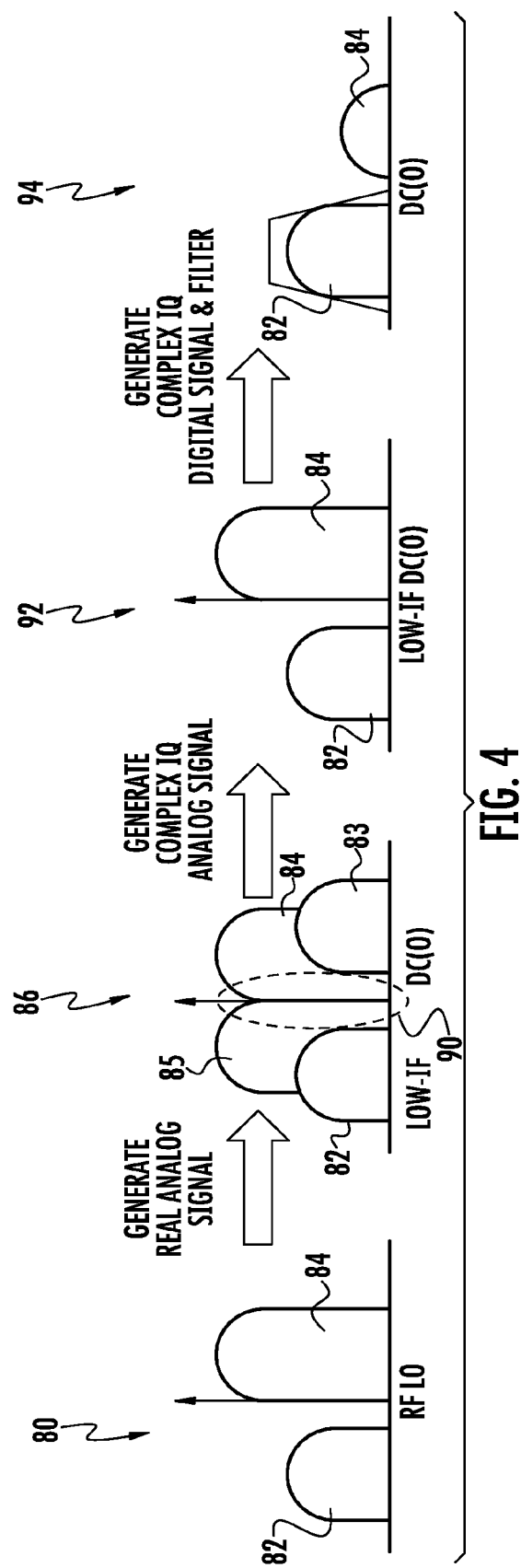

RECEIVER WITH SELECTIVE SIGNAL PATH OPERATION AND ASSOCIATED METHODS

TECHNICAL FIELD

The present disclosure relates to the field of receivers, and more particularly, to low intermediate frequency (low-IF) receivers.

BACKGROUND

Mobile wireless communications systems continue to grow in popularity and have become an integral part of both personal and business communications. For example, cellular telephones allow users to place and receive voice calls almost anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc.

Such multi-function devices may also allow users to wirelessly send and receive electronic mail (email) messages and access the Internet via a cellular network and/or a wireless local area network (WLAN), for example. Many of these devices include low intermediate frequency (low-IF) receivers. A low-IF receiver has two down conversion stages, i.e., a two step down-conversion to DC of the received radio frequency (RF) signals.

A first down conversion stage operates at a carrier frequency minus an intermediate frequency, and a second down conversion stage operates at the intermediate frequency. The first down conversion stage is a quadrature down converter (complex mixer) that down converts the received RF signals to a complex analog in-phase and quadrature (I/Q) form with a small frequency offset, i.e., a low-IF. The complex analog in-phase and quadrature signals are then digitized so that the second down conversion stage converts these signals to DC using a digital complex mixer.

A problem with receivers, and particularly low-IF receivers, is high current consumption. This is because the first down conversion stage in the low-IF receiver has two independent analog/RF circuit paths that carry the I and Q signal representations. Current consumption is especially problematic for battery operated devices where there is a need for prolonging the life of the battery.

BRIEF DESCRIPTION OF THE DRAWINGS

FIG. 1 is a schematic block diagram of a receiver in accordance with the present disclosure.

FIG. 2 are schematic spectral graphs of a wanted signal with an adjacent interference signal when both of the in-phase and quadrature channel paths in the receiver illustrated in FIG. 1 are powered on.

FIG. 3 are schematic spectral graphs of a wanted signal with no adjacent interference signal when only one of the in-phase and quadrature channel paths in the receiver illustrated in FIG. 1 is powered on.

FIG. 4 are schematic spectral graphs of a wanted signal with an adjacent interference signal when only one of the in-phase and quadrature channel paths is powered on and then when both of the in-phase and quadrature channel paths are powered on in the receiver illustrated in FIG. 1.

DETAILED DESCRIPTION

Figure 5:
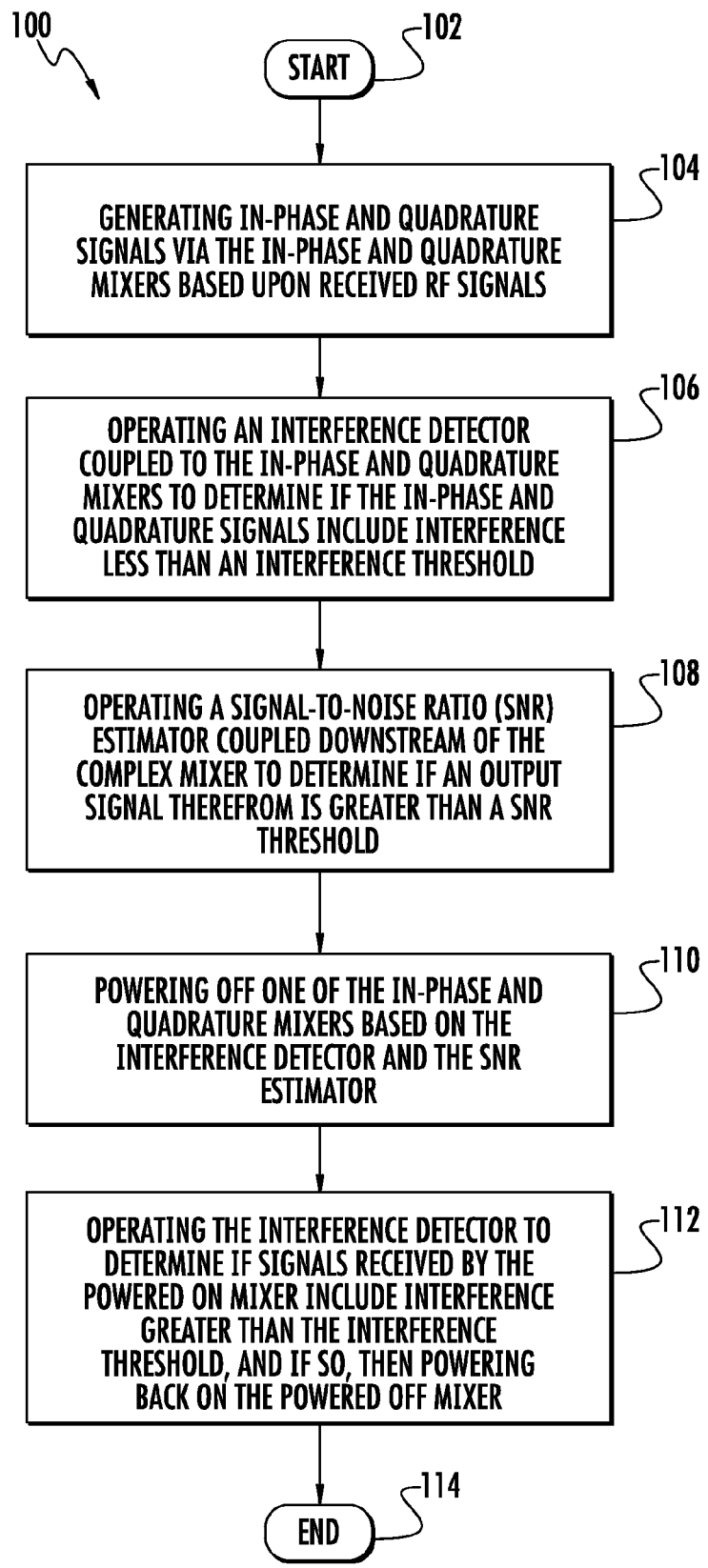
FIG. 5 is a flowchart illustrating a method for operating a receiver in accordance with the present disclosure.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

In accordance with one exemplary aspect, a receiver includes a first local oscillator, and an in-phase mixer and a quadrature mixer coupled to the first local oscillator and configured to generate in-phase (I) and quadrature (Q) signals based upon received RF signals. A complex mixer is downstream from the in-phase and quadrature mixers. A controller is coupled to the in-phase and quadrature mixers and is configured to determine when the in-phase and quadrature signals include interference less than an interference threshold, and then power off one of the in-phase and quadrature mixers.

As will be explained in greater detail below, the in-phase and quadrature mixers are within their respective in-phase and quadrature analog paths, and these paths include other analog components. When one of the in-phase and quadrature mixers is powered off, then the corresponding in-phase or quadrature analog path is being powered off.

When the controller determines that the receiver is operating in a relatively clean environment, the received RF signals can be down-converted as a real analog signal (I or Q) by using only one of the in-phase and quadrature mixers instead of down-converting the received RF signals as a complex (I and Q) analog signal. For a battery operated receiver, powering off one of the in-phase and quadrature mixers advantageously prolongs the life of the battery while maintaining communications.

When switching from a complex representation to a real representation of the received RF signals within the receiver, an image is created, i.e., a negative frequency creates an equivalent image of the positive frequency, and vice-versa. However, the image signal may be readily suppressed using a low pass filter that is downstream from the complex mixer.

The controller may comprise an interference detector, such as a spectrum density estimator, for example. The controller may further comprise a signal-to-noise ratio (SNR) estimator cooperating with the interference detector and coupled downstream of the complex mixer. The receiver may further comprise a low pass filter coupled between the complex mixer and the SNR estimator. The SNR estimator may be configured to determine when an output signal from the low pass filter is greater than a SNR threshold.

The receiver may further comprise a first analog-to-digital converter coupled between the in-phase mixer and the complex mixer, and a second analog-to-digital converter coupled between the quadrature mixer and the complex mixer. The controller may only be coupled to an output of one of the first and second analog-to-digital converters that is associated with the in-phase or quadrature mixer (i.e., the in-phase or quadrature analog path) that remains powered on.

The receiver may further comprise a battery to power the first local oscillator, the in-phase and quadrature mixers, the complex mixer and the controller. The controller may be coupled between the battery and the in-phase or quadrature mixer that is to be powered off.

A method aspect is for operating a receiver as described above. The method comprises generating in-phase and quadrature signals via the in-phase and quadrature mixers based upon received RF signals, and operating the controller to determine when the in-phase and quadrature signals include interference less than the interference threshold, and then power off one of the in-phase and quadrature mixers.

Referring now to FIG. 1, a receiver 10 includes a first local oscillator 12, and an in-phase (I) mixer 14a and a quadrature (Q) mixer 14b coupled to the first local oscillator. The in-phase and quadrature mixers 14a, 14b are configured to generate in-phase and quadrature signals based upon received RF signals. The in-phase signals are provided to an I channel path 16a, and the quadrature signals are provided to a Q channel path 16b. A complex mixer 26 is downstream from the in-phase and quadrature mixers 14a, 14b. A controller 40 is coupled to the in-phase and quadrature mixers 14a, 14b and is configured to determine if the in-phase and quadrature signals include interference less than an interference threshold, and if so, then turns off one of the in-phase and quadrature mixers.

The circuitry of the receiver 10 is illustratively powered by a battery 50. As will be explained in greater detail below, the receiver 10 has independent power control for the I and Q channel paths 16a, 16b. In a clean RF environment, the wanted signals have a high signal-to-noise ratio and there are no adjacent interference signals or the adjacent interference signals are below the interference threshold. This advantageously allows the analog/RF components supporting the I channel path 16a or the analog/RF components supporting the Q channel path 16b to be powered off, which, in turn, prolongs the life of the battery 50.

Still referring to FIG. 1, the receiver 10 is illustratively a low intermediate frequency (low-IF) receiver, and includes an antenna 20 configured to receive RF signals, i.e., input signals. The antenna 20 is coupled to a low noise amplifier 22 since the input signals may be very low power. The amplified input signals are then passed to the in-phase and quadrature mixers 14a, 14b.

The first local oscillator 12 is operating at a first intermediate frequency, and is coupled to the in-phase mixer 14a through a phase delay block 15, and to the quadrature mixer 14b. The phase delay block 15 separates the phase of the input signals received by the in-phase and quadrature mixers 14a, 14b from the first local oscillator 12 by 90 degrees. This arrangement results in the in-phase and quadrature mixers 14a, 14b driving the input signals to a low-IF.

The in-phase and quadrature mixers 14a, 14b are, in turn, coupled to analog filters 18a, 18b. The analog filters 18a, 18b are coupled to analog-to-digital converters (ADCs) 24a, 24b. The analog-to-digital converters 24a, 24b are in turn coupled to the complex mixer 26. One of the analog-to-digital converters 24a is also coupled to the controller 40. The complex mixer 26 is coupled to a second local oscillator 28 operating at a second intermediate frequency. The second local oscillator 28 drives the received RF signals to DC.

A digital low pass filter 30 is coupled to the complex mixer 26. Although not illustrated, a baseband processor is coupled downstream of the digital low pass filter 30. Those skilled in the art will appreciate that at least one of the analog-to-digital converters 24a or 24b and the digital low pass filter 30 are coupled to the controller 40. The controller 40 is configured to determine when the RF signals as received by the antenna 20 include an interference signal less than the interference threshold, and when a SNR of an output signal from the digital low pass filter 30 is greater than a SNR threshold.

More particularly, the controller 40 includes an interference detector 42 and a SNR estimator 44. The interference detector 42 may be a spectrum density estimator, for example, that performs an FFT on the received RF signals. The interference detector 42 determines the presence of interference signals on the output of one of the ADCs.

In the illustrated embodiment, the interference detector 42 is coupled to the output of the ADC 24a in the I channel path 16a. As highlighted by the dashed block 17 in FIG. 1, the Q channel path 16b has its separate power domain. Since the Q channel path 16b will be powered off when the interference detector 42 detects a clean environment, the environment will continued to still be monitored via the I channel path 16a. Consequently, the interference detector 42 is coupled to the output of the ADC that is to remain powered on. Although the Q channel path 16b has its own separate power domain 17, the roles may be reversed so that the I channel path 16a has its own separate power domain while the interference detector 42 is coupled to the output of the ADC 24b in the Q channel path 16b.

The SNR estimator 44 serves as an override of the interference detector 42. For instance, it may be hard to detect a blinking interference or a jammer that does not transmit uniformly spaced signals. Even though the interference detector 42 may detect a relatively clean environment, the SNR of the output signal from the digital low pass filter 30 may be low nonetheless, i.e., less than the desired SNR threshold. This is a result of the interference signal overlapping with the wanted signal. Based on the SNR estimator 44, the controller 40 will power back on the Q channel path 16b even though the interference detector 42 is detecting a relatively clean environment.

The battery 50 is coupled to the controller 40, which in turn controls the power to the Q channel path 16b, which has a separate power domain 17. The battery 50 is also coupled to circuitry other than the separate power domain. When the Q channel path 16b is powered off, then power is removed from the quadrature mixer 14b which has its own PLL associated therewith, the filter 18b, and the ADC 24b. Powering off the analog/RF circuits that carry the Q signal representation advantageously prolongs the life of the battery 50 while maintaining communications using the I signal representation in the I channel path 16a.

Operation of the receiver 10 will now be discussed in reference to schematic spectral graphs provided in FIGS. 2, 3 and 4. As noted above, a main feature of the quadrature down-conversion stage 14a, 14b and subsequent complex analog IQ signal representation within the receiver 10 is image suppression.

Image suppression is advantageous when the signals received by the antenna 20 include interference. Without image suppression, one side (negative) of the frequency folds on top of the other side (positive) of the frequency. However, when the controller 40 determines that the receiver 10 is operating in a relatively clean environment, the received RF signals can be down-converted as a real analog signal (I or Q) by using only one of the in-phase and quadrature mixers 14a or 14b instead of down-converting the received RF signals as a complex (I and Q) analog signal. For a battery operated receiver, powering off one of the in-phase and quadrature mixers advantageously prolongs the life of the battery 50 while maintaining communications.

When switching from a complex representation to a real representation of the received RF signals within the receiver 10, an image is created, i.e., a negative frequency creates an equivalent image of the positive frequency, and vice-versa.

However, the image signal may be readily suppressed using a digital low pass filter 30 that is downstream from the complex mixer 26.

Referring now to FIG. 2, reception of a wanted signal with an adjacent interference signal will be discussed in terms of being received, down-converted and filtered by the receiver 10 when both of the in-phase and quadrature channels 16a, 16b are powered on. This is a full power mode of the receiver 10.

Spectral graph 60 illustrates the signals as received by the antenna 20 at a carrier frequency, i.e., RF LO. The received RF signals include a wanted signal 62 and an adjacent interference signal 64. The wanted signal 62 is offset from the adjacent interference signal 64 by the low-if frequency. This offset may be a few hundred kHz for GSM signals, and a few MHz for CDMA signals, for example.

Spectral graph 66 illustrates the wanted signal 62 and the adjacent interference signal 64 as output from the in-phase and quadrature mixers 14a, 14b. Since both of the I and Q channel paths 16a, 16b are powered on, a complex IQ analog signal is generated. The wanted signal 62 is centered at the low-IF and the adjacent interference signal 64 is close to DC.

Spectral graph 68 illustrates the output of the complex mixer 26 after filtering by the digital low pass filter 30. The wanted signal 62 is now centered at DC whereas the interference signal 64 has been suppressed by the digital low pass filter 30.

Referring now to FIG. 3, reception of a wanted signal will be discussed in terms of being received, down-converted and filtered by the receiver 10 when only one of the in-phase and quadrature channel paths 16a, 16b is powered on. No adjacent interference signal is present, or if an adjacent interference signal is present, it is below the interferences threshold. This is a power saving mode of the receiver 10.

Spectral graph 70 illustrates the signals as received by the antenna 20 at the carrier frequency. The received RF signals include a wanted signal 72 without an adjacent interference signal. The wanted signal 72 is offset from the carrier frequency by the low-IF frequency.

Spectral graph 76 illustrates the wanted signal 72 as output from only one of the in-phase and quadrature mixers 14a, 14b. In this case, only the I channel path 16a is powered on. As a result, a real analog signal (I) is provided to the complex mixer 26. However, since only the I channel path 16a is powered on, an image of the wanted signal 74 is also generated. The image of the wanted signal 74 is opposite in frequency to the frequency of the wanted signal 72.

Spectral graph 78 illustrates the output of the complex mixer 26 after filtering by the digital low pass filter 30. The wanted signal 72 is now centered at DC whereas the image of the wanted signal 76 has been suppressed by the digital low pass filter 30.

Referring now to FIG. 4, reception of a wanted signal with an adjacent interference signal will be discussed in terms of being received, down-converted and filtered by the receiver 10 when only the I channel path 16a is powered on, and then when both of the I and Q channel paths 16a, 16b are powered on. This is the receiver 10 changing from the power saving mode to the full power mode.

Spectral graph 80 illustrates the signals as received by the antenna 20 at the carrier frequency. The received RF signals include a wanted signal 82 and an adjacent interference signal 84. The wanted signal 82 is offset from the adjacent interference signal 84 by the low-IF frequency.

Initially, only the I channel path 16a is powered on. In this configuration, the output of the in-phase mixer 14a is a real analog signal as represented by spectral graph 86. However, in addition to the output of the in-phase mixer 14a including the wanted signal 82 and the interference signal 86, images of these signals are also present. Reference 83 is an image of the wanted signal, whereas reference 85 is an image of the interference signal 84.

As discussed above, the controller includes an interference detector 42 and a SNR estimator 44. The interference detector 42 determines the presence within the dashed area 90 of interference signals on the output of ADC 24a. Alternatively, the SNR estimator 44 may determine that the SNR of the wanted signal is less than a SNR threshold independent of the interference detector 42.

In response to the controller 40, the receiver 10 is placed in the full power mode by powering back on the Q channel path 16b. Spectral graph 92 illustrates the wanted signal 82 and the adjacent interference signal 84 as output from the in-phase and quadrature mixers 14a, 14b without their corresponding image signals 83, 85. Since both of the I and Q channel paths 16a, 16b are powered on, a complex IQ analog signal is generated. The wanted signal 82 is centered at the low-IF and the adjacent interference signal 64 is close to DC.

Spectral graph 94 illustrates the output of the complex mixer 26 after filtering by the filter 30. The wanted signal 82 is now centered at DC whereas the interference signal 84 has been suppressed by the filter 30.

A flowchart 100 illustrating a method for operating a receiver 10 as described above will now be discussed in reference to FIG. 5. From the start (Block 102), the method comprises generating in-phase and quadrature signals via the in-phase and quadrature mixers 14a, 14b based upon received RF signals at Block 104. An interference detector 42 is operated at Block 106 to determine if the in-phase and quadrature signals include interference less than an interference threshold. An SNR estimator 44 coupled downstream of the complex mixer 26 is operated at Block 108 to determine if an output signal therefrom is greater than a SNR threshold. One of the in-phase and quadrature mixers 14a, 14b is powered off at Block 110 based on the interference detector and said SNR estimator. The method further comprises operating the controller 40 at Block 112 to determine if signals received by the powered on in-phase or quadrature mixer 14a or 14b include interference greater than the interference threshold, and if so, then powering back on the powered off in-phase or quadrature mixer. The method ends at Block 114.

Figure 6:
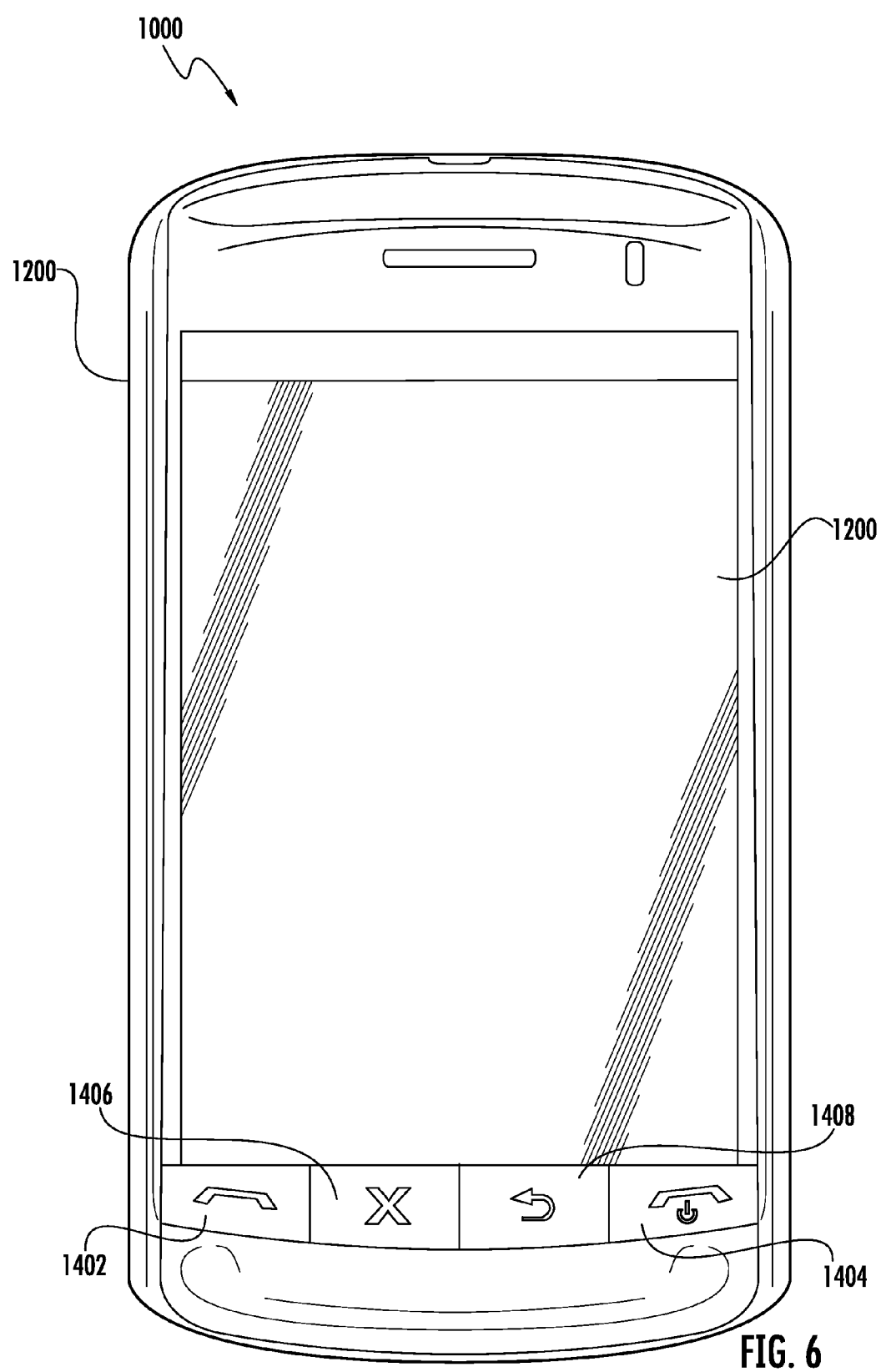
FIG. 6 is a front view of a mobile wireless communications device in accordance with the present disclosure.

Exemplary components that may be used in various embodiments of the above-described mobile wireless communications device are now described with reference to an exemplary mobile wireless communications device 1000 shown in FIGS. 6 and 7.

The mobile wireless communications device 1000 illustratively includes a portable housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. The keypad 1400 includes a plurality of control keys including an "off hook" (i.e., initiate phone call) key 1402, an "on hook" (i.e., discontinue phone call) key 1404, a menu key 1406, and a return or escape key 1408.

A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 7:
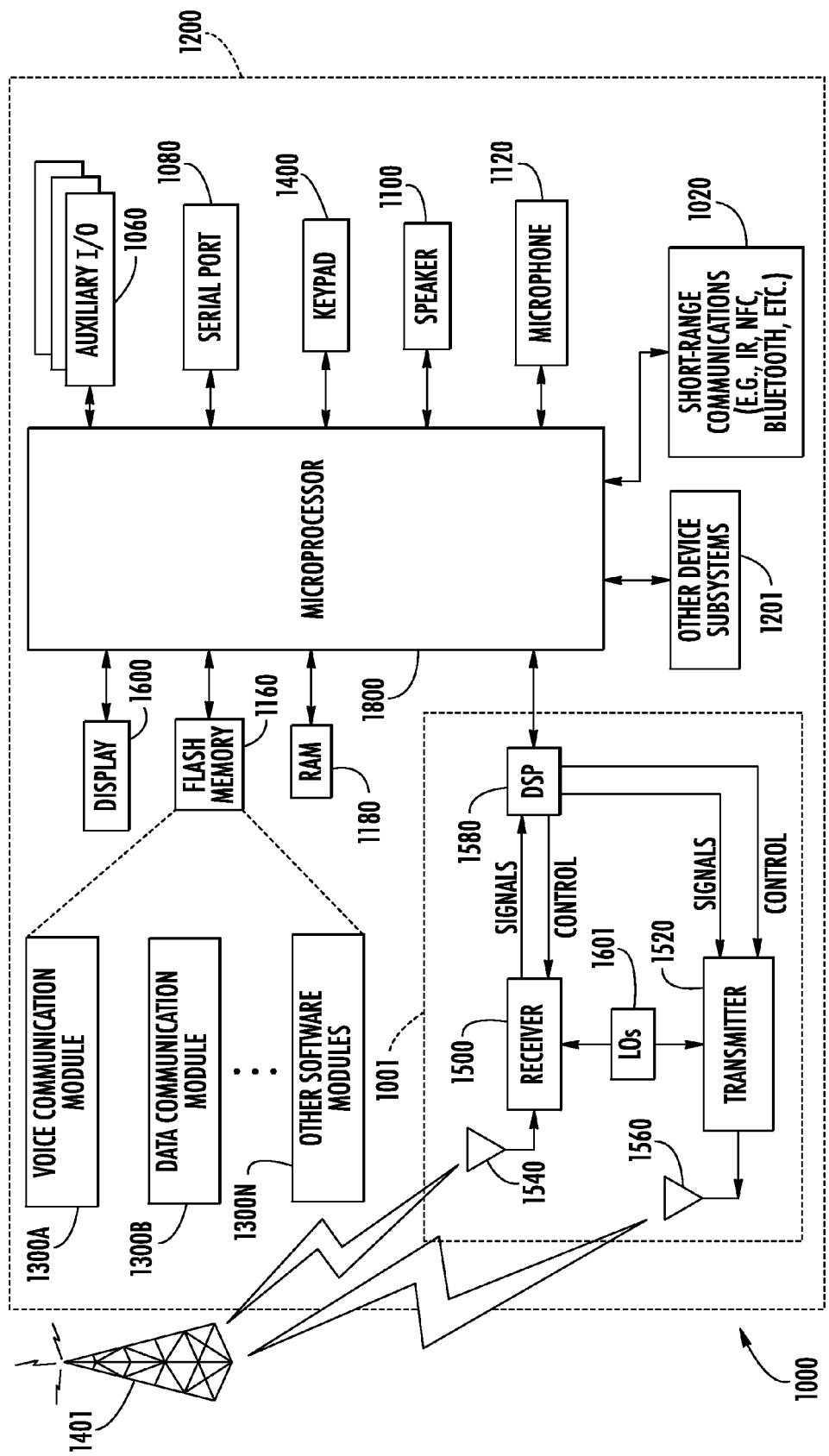
FIG. 7 is a schematic block diagram illustrating additional components that may be included in the mobile wireless communications device illustrated in FIG. 6.

In addition to the processing device 1800, other parts of the mobile device 1000 are shown schematically in FIG. 7. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the disclosure will come to the mind of one skilled in the art having the benefit of the teachings presented in the foregoing descriptions and the associated drawings. Therefore, it is understood that the disclosure is not to be limited to the specific embodi- That which is claimed is:

1. A receiver comprising:
a first local oscillator;
an in-phase mixer and a quadrature mixer coupled to said first local oscillator and configured to generate in-phase and quadrature signals based upon received RF signals;
a complex mixer downstream from said in-phase and quadrature mixers;
a first analog-to-digital converter coupled between said in-phase mixer and said complex mixer, and a second analog-to-digital converter coupled between said quadrature mixer and said complex mixer;
a controller coupled to said in-phase and quadrature mixers and configured to determine when the in-phase and quadrature signals include interference less than an interference threshold, and then power off one of said in-phase and quadrature mixers; and
a battery to power said first local oscillator, said in-phase and quadrature mixers, said complex mixer and said controller;
wherein said controller is coupled between said battery and the in-phase or quadrature mixer that is being powered off and is only coupled to an output of one of said first and second analog-to-digital converters that is associated with the in-phase or quadrature mixer remaining powered on.

2. The receiver of claim 1, wherein said controller comprises an interference detector.

3. The receiver of claim 2, wherein said interference detector comprises a spectrum density estimator.

4. The receiver of claim 2, wherein said controller further comprises a signal-to-noise ratio (SNR) estimator cooperating with said interference detector and coupled downstream of said complex mixer.

5. The receiver of claim 4, further comprising a low pass filter coupled between said complex mixer and said SNR estimator, and wherein said SNR estimator is configured to determine when an output signal from said low pass filter is greater than a SNR threshold.

6. The receiver of claim 5, wherein said controller is further configured to power back on the in-phase or quadrature mixer that is powered off when said SNR estimator determines that the output signal is less than the SNR threshold.

7. The receiver of claim 1, further comprising a first filter and a second filter, wherein the first filter and the first analog-to-digital converter are coupled between said in-phase mixer and said complex mixer, and the second filter and the second analog-to-digital converter are coupled between said quadrature mixer and said complex mixer; and wherein said controller is further configured to power off the first filter and the first analog-to-digital converter or the second filter and the second analog-to-digital converter that are associated with the in-phase or quadrature mixer being powered off.

8. A receiver comprising:
a first local oscillator;
an in-phase mixer and a quadrature mixer coupled to said first local oscillator and configured to generate in-phase and quadrature signals based upon received RF signals;
a complex mixer downstream from said in-phase and quadrature mixers;
a first analog-to-digital converter coupled between said in-phase mixer and said complex mixer, and a second analog-to-digital converter coupled between said quadrature mixer and said complex mixer;
a controller comprising
an interference detector coupled to said in-phase and quadrature mixers and configured to determine when the in-phase and quadrature signals include interference less than an interference threshold, and
a signal-to-noise ratio (SNR) estimator coupled downstream of said complex mixer and configured to determine when an output signal therefrom is greater than a SNR threshold; and
a battery to power said first local oscillator, said in-phase and quadrature mixers, said complex mixer and said controller;
said controller configured to power off one of said in-phase and quadrature mixers based on said interference detector and said SNR estimator, said controller being coupled between said battery and the in-phase or quadrature mixer that is being powered off and only coupled to an output of one of said first and second analog-to-digital converters that is associated with the in-phase or quadrature mixer remaining powered on.

9. The receiver of claim 8, wherein said interference detector comprises a spectrum density estimator.

10. The receiver of claim 8, further comprising a low pass filter coupled between said complex mixer and said SNR estimator.

11. The receiver of claim 8, wherein said controller is further configured to power back on the in-phase or quadrature mixer that is powered off when said SNR estimator determines that the output signal is less than the SNR threshold.

12. The receiver of claim 8, further comprising a first filter and a second filter, wherein the first filter and the first analog-to-digital converter are coupled between said in-phase mixer and said complex mixer, and the second filter and the second analog-to-digital converter are coupled between said quadrature mixer and said complex mixer; and wherein said controller is further configured to power off the first filter and the first analog-to-digital converter or the second filter and the second analog-to-digital converter that are associated with the in-phase or quadrature mixer being powered off.

13. A method for operating a receiver comprising a first local oscillator, an in-phase mixer and a quadrature mixer coupled to the first local oscillator, a complex mixer downstream from the in-phase and quadrature mixers, a first analog-to-digital converter coupled between the in-phase mixer and the complex mixer, and a second analog-to-digital converter coupled between the quadrature mixer and the complex mixer, a controller coupled to the in-phase and quadrature mixers, and a battery to power the first local oscillator, the in-phase and quadrature mixers, the complex mixer and the controller the method comprising:
generating in-phase and quadrature signals via the in-phase and quadrature mixers based upon received RF signals; and
operating the controller to determine when the in-phase and quadrature signals include interference less than an interference threshold, and then powering off one of the in-phase and quadrature mixers;
wherein the controller is coupled between the battery and the in-phase or quadrature mixer that is being powered off and only coupled to an output of one of said first and second analog-to-digital converters that is associated with the in-phase or quadrature mixer remaining powered on.

14. The method of claim 13, wherein the controller comprises an interference detector.

15. The method of claim 14, wherein the interference detector comprises a spectrum density estimator.

16. The method of claim 14, wherein the controller further comprises a signal-to-noise ratio (SNR) estimator cooperating with the interference detector and coupled downstream of the complex mixer and configured to determine when an output signal therefrom is greater than a SNR threshold.

17. The method of claim 16, wherein the controller is further configured to power back on the in-phase or quadrature mixer that is powered off when the SNR estimator determines that the output signal is less than the SNR threshold.

18. The method of claim 13, further comprising operating the controller to determine if signals received by the powered on in-phase or quadrature mixer include interference greater than the interference threshold, and if so, then powering back on the powered off in-phase or quadrature mixer.

19. The method of claim 16, wherein the receiver further comprises a low pass filter coupled between the complex mixer and the SNR estimator.

20. The method of claim 13, wherein the receiver further comprises a first filter and a second filter, the first filter and the first analog-to-digital converter are coupled between the in-phase mixer and the complex mixer, and the second filter and the second analog-to-digital converter are coupled between the quadrature mixer and the complex mixer; and wherein operating the controller further comprises powering off the first filter and the first analog-to-digital converter or the second filter and the second analog-to-digital converter that is associated with the in-phase or quadrature mixer being powered off.

21. A receiver comprising:
a first local oscillator;
an in-phase mixer and a quadrature mixer coupled to said first local oscillator and configured to generate in-phase and quadrature signals based upon received RF signals;
a complex mixer downstream from said in-phase and quadrature mixers;
a first analog-to-digital converter coupled between said in-phase mixer and said complex mixer, and a second analog-to-digital converter coupled between said quadrature mixer and said complex mixer; and
a controller coupled to said in-phase and quadrature mixers and configured to determine when the in-phase and quadrature signals include interference less than an interference threshold, and then power off one of said in-phase and quadrature mixers;
wherein said controller is only coupled to an output of one of said first and second analog-to-digital converters that is associated with the in-phase or quadrature mixer remaining powered on.

22. The receiver of claim 21, wherein said controller comprises an interference detector.

23. The receiver of claim 22, wherein said controller further comprises a signal-to-noise ratio (SNR) estimator cooperating with said interference detector and coupled downstream of said complex mixer.

* * * * *